United States Patent
Rastegari et al.

(10) Patent No.: US 9,159,123 B2
(45) Date of Patent: Oct. 13, 2015

(54) IMAGE PRIOR AS A SHARED BASIS MIXTURE MODEL

(71) Applicant: Adobe Systems Incorporated, San Jose, CA (US)

(72) Inventors: Mohammad Rastegari, College Park, MD (US); Aaron P. Hertzmann, San Francisco, CA (US); Elya Shechtman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/163,910

(22) Filed: Jan. 24, 2014

(65) Prior Publication Data

US 2015/0213583 A1 Jul. 30, 2015

(51) Int. Cl.
*G06T 5/00* (2006.01)
*G06T 5/50* (2006.01)

(52) U.S. Cl.
CPC . *G06T 5/005* (2013.01); *G06T 5/50* (2013.01); *G06T 5/002* (2013.01); *G06T 5/003* (2013.01)

(58) Field of Classification Search
CPC ............ G06K 9/00275; G06K 9/6214; G06K 9/6247; G06K 9/40; G06K 9/40; G06T 3/4053; G06T 5/002; G06T 5/003; G06T 2207/20182; G06T 2207/20016; G06T 5/00; G06T 5/50
USPC .......................... 382/275, 159, 155, 260, 299
See application file for complete search history.

(56) References Cited

U.S. PATENT DOCUMENTS

| | | | |
|---|---|---|---|
| 2007/0258648 A1* | 11/2007 | Perronnin | 382/224 |
| 2010/0329529 A1* | 12/2010 | Feldman et al. | 382/131 |
| 2011/0026849 A1* | 2/2011 | Kameyama | 382/260 |
| 2012/0114226 A1* | 5/2012 | Kameyama | 382/155 |
| 2012/0128238 A1* | 5/2012 | Kameyama | 382/159 |
| 2012/0134579 A1* | 5/2012 | Kameyama | 382/159 |

OTHER PUBLICATIONS

"Natural Images, Gaussian Mixtures and Dead Leaves",Zoran, et al.In NIPS, pp. 1745-1753, 2012., 9 pages.*
"Learning a multivariate Gaussian mixture model with the reversible jump MCMC algorithm", Zhang et al., Statistics and Computing 14: pp. 343-355, 2004, Kluwer Academic Publishers.*
Efficient Covariance-based Algorithms for Appearance Modeling in Computer Vision, Adway Mitra, A Project Report, published in 2010, pp. 19.*
Rudin, et al., "Nonlinear Total Variation Based Noise Removal Algorithms", In Proceedings of the eleventh annual in-ternational conference of the Center for Nonlinear Studies on Experimental mathematics, 1992, pp. 259-268.

(Continued)

*Primary Examiner* — Mekonen Bekele
(74) *Attorney, Agent, or Firm* — Wolfe-SBMC

(57) ABSTRACT

An image prior as a shared basis mixture model is described. In one or more implementations, a plurality of image patches are generated from one or more images. A shared basis mixture model is learned to model an image patch distribution of the plurality of image patches from the one or more images as part of a Gaussian mixture model. An image may then be reconstructed using the shared basis mixture model as an image prior.

20 Claims, 13 Drawing Sheets

(56) References Cited

OTHER PUBLICATIONS

Zoran, et al., "From Learning Models of Natural Image Patches to Whole Image Restoration", Retrieved from <http://www.cs.huji.ac.il/~daniez/EPLLICCVCameraReady.pdf> on Nov. 28, 2012, 8 pages.

Zoran, et al., "Natural Images, Gaussian Mixtures and Dead Leaves", In NIPS, pp. 1745-1753, 2012., 9 pages.

* cited by examiner

400

Algorithm 1: EM algorithm for Complete SBMs

Input: $y_{1:N}$
Set U to PCA or RICA basis
Initialize $\gamma$ with uniform random values, normalized
Run one M-step as below
while *not converged* do
  // E-step:
  $$\gamma_{ij} \leftarrow \frac{a_j \mathcal{N}(y_i; 0, U\Lambda_j U^T)}{\sum_\ell a_\ell \mathcal{N}(y_i; 0, U\Lambda_\ell U^T)}$$
  // M-step:
  $$a_j \leftarrow \sum_i \gamma_{ij}/N$$
  $$\Lambda_j \leftarrow \left(U^{-1}\left(\frac{\sum_i \gamma_{ij} y_i y_i^T}{\sum_i \gamma_{ij}}\right)U^{-T}\right) \circ I$$
end
return $U, a, \Lambda_{1:N}$

*Fig. 4*

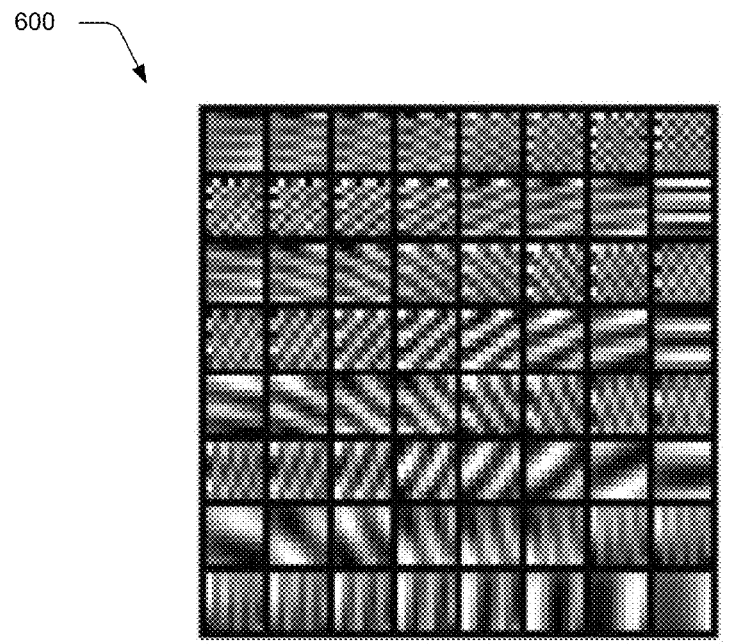
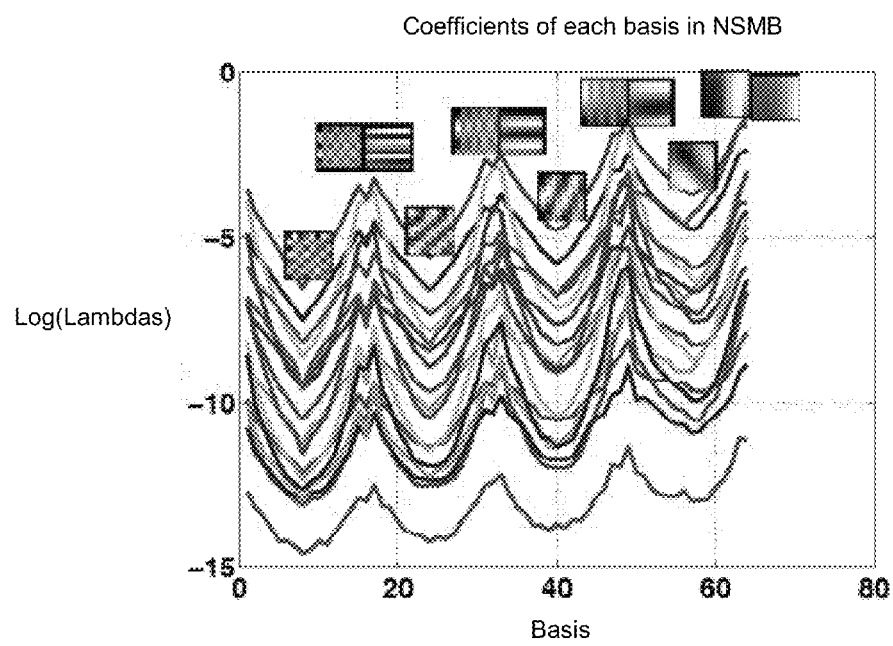
Fig. 6

700

Algorithm 2: EM algorithm for Overcomplete SBMs

Input: $y_{1:N}$
// *Initialization:*
$U \leftarrow [U_{PCA}, U_{RICA}]$ ; $\alpha \leftarrow 10^{-6}$
Initialize diagonals of $\Lambda_{1:J}$ with uniform random values in $[0..1]$
Initialize $\gamma$ with uniform random values, normalized
Run an E-step without updating $\gamma$ to initialize the rest
Run one M-step as below
// *EM iterations:*
while *not converged* do
    // *E-step*
    for *each data point i and component j* do
        $\gamma_{i,j} \leftarrow \frac{a_j \mathcal{N}(y_i|0, U\Lambda_j U^T + \alpha I)}{\sum_j a_j \mathcal{N}(y_i|0, U\Lambda_j U^T + \alpha I)}$
        $B_j \leftarrow \Lambda_j U^T (U\Lambda_j U^T + \alpha I)^{-1}$
        $\mu_i \leftarrow \sum_j \gamma_{i,j} B_j y_i$
        $\Phi_i^{(j)} \leftarrow \Lambda_j - B_j U \Lambda_j + B_j y_i y_i^T B_j^T$
    end
    $\Phi \leftarrow \sum_{i,j} \gamma_{i,j} \Phi_i^{(j)}$
    // *M-step*
    $U \leftarrow \left(\sum_i y_i \mu_i^T\right) \Phi^{-1}$
    for *each component j* do
        $a_j \leftarrow \sum_i \gamma_{i,j}/N$
        $\Lambda_j \leftarrow \sum_i \gamma_{i,j} \left(\Phi_i^{(j)} \circ I\right) / \sum_i \gamma_{i,j}$
    end
    $\alpha \leftarrow \frac{1}{ND} \sum_i \|y_i - U\mu_i\|^2 + \frac{1}{ND} \text{tr}\left(U^T U (\Phi - \sum_i \mu_i \mu_i^T)\right)$
    // *Normalization:*
    $D \leftarrow \sqrt{(U^T U) \circ I}$
    $U \leftarrow UD$, $\quad \Lambda_j \leftarrow \Lambda_j D^{-2}$
end
Return: $U, \Lambda_{1:J}, a_{1:J}, \alpha$.

*Fig. 7*

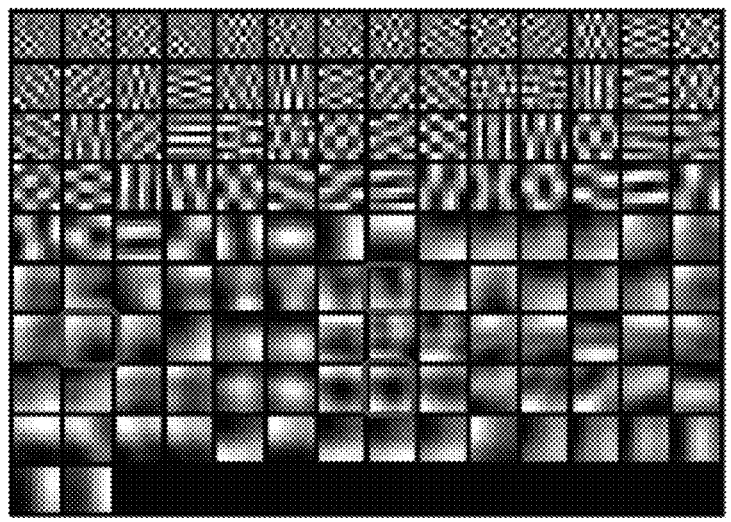
Coefficients of each basis in OSBM
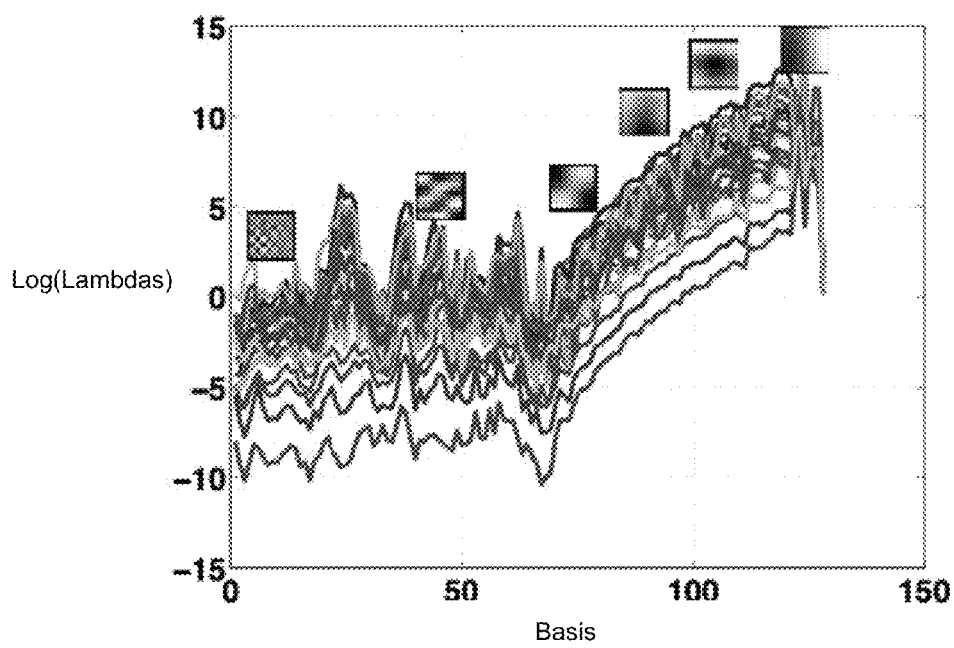
Fig. 8

IMAGE PRIOR AS A SHARED BASIS MIXTURE MODEL

BACKGROUND

A variety of different image processing techniques have been developed to change characteristics of images. One class of image modifications is configured to clean corrupted images. Images may be captured by a variety of different devices, such as a dedicated camera, a mobile phone, tablet computer, and so on. However, an environment in which the image was captured as well as limitations of the image capture device, itself, may have an adverse effect on the image.

Accordingly, image reconstruction techniques have been developed to correct these adverse effects, such as through denoising, deblurring, hole filling, and so on. In some instances, performance of these techniques involves use of an image prior that is utilized to define rules to be followed in reconstructing the image, such as to define characteristics of natural images. However, conventional techniques that are employed to apply image priors are either low-quality, or else resource intensive and thus could consume a significant amount of resources of a computing device that employs these techniques, limit which computing devices are capable of performing this techniques, involve a significant amount of time to perform the techniques, and so forth.

SUMMARY

An image prior as a shared basis mixture model is described. In one or more implementations, a plurality of image patches are generated from one or more images. A shared basis mixture model is learned to model an image patch distribution of the plurality of image patches from the one or more images as part of a Gaussian mixture model. An image may then be reconstructed using the shared basis mixture model as an image prior.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 depicts an example implementation of an expectation/maximization algorithm configured to learn a shared basis mixture (SBM).

FIGS. 5 and 6 show examples of learned diagonal scaling matrix "$\Lambda_j$" values.

FIG. 7 depicts an example of an expectation/maximization algorithm for overcomplete shared basis mixtures.

FIG. 8 illustrations a visualization of a learned overcomplete basis (OSBM).

DETAILED DESCRIPTION

Overview

Image reconstruction typically involves restoration of a corrupted image to correct noise, blurriness, a hole in the image, and so on. This reconstruction may be performed through use of an image prior, which is used to define rules to be followed in restoring the image, such as to define statistics of a natural image (e.g., a mathematical distribution) such that the image is restored in a manner that looks natural. For example, the image prior may be configured to define structures that may be found in natural images, such as to describe textures and colors of the image that define the structures. The image prior may then be used bias reconstruction of an image toward selection from those structures based on the use of the image prior to supervise the image reconstruction. However, conventional techniques that are utilized to generate image priors were resource intensive and therefore could be limited in their usefulness.

Accordingly, a probabilistic model for image patches is described that may be utilized as an image prior, e.g., for image denoising, deblurring, hole filling, and so on. The model may be configured as a shared basis mixture model in which a Gaussian mixture model is utilized having components that share a set of basis vectors. The Gaussian mixture model, for instance, may be configured as a type of density model having a number of Gaussian component functions. These Gaussian component functions are combined to define a multimodal density which may be employed for a variety of purposes, such as to model colors and textures to define structures in an image as described above. Thus, the Gaussian mixture models generated from the image may be utilized to define structure and other components found in those images. The models, may be generated in a variety of ways, such as learned from a collection of image patches, e.g., from natural images. The models may also be configured in a variety of different ways, such as with complete bases, overcomplete bases, and so on as described in greater detail in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
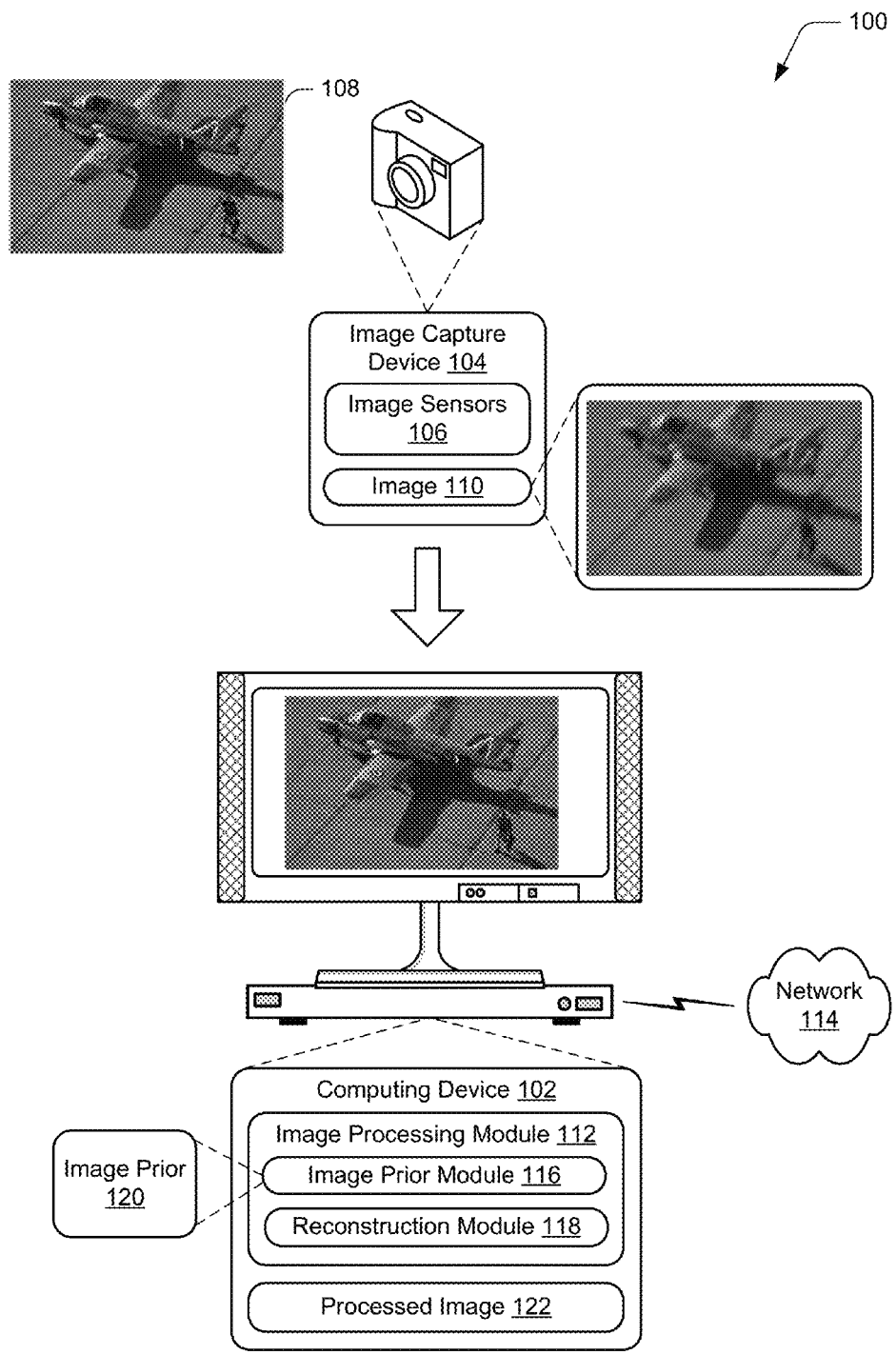
FIG. 1 is an illustration of an environment in an example implementation that is operable to employ techniques described herein relating to a shared basis mixture model.

FIG. 1 is an illustration of an environment 100 in an example implementation that is operable to employ classification techniques described herein. The illustrated environment 100 includes a computing device 102 and an image capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 13.

The image capture device 104 may also be configured in a variety of ways. For example, the image capture device 104 may be configured as a stand-alone camera as illustrated, a video camera, scanner, copier, mobile device, and so forth. Although the image capture device 104 is illustrated separately from the computing device 102, the image capture device 104 may be configured as part of the computing device 102, e.g., for a tablet configuration, smart phone, and so forth.

The image capture device 104 is illustrated as including image sensors 106 that are configured to capture an image of an image scene 108, which is stored as image 110. For example, the image sensors 106 may be configured to capture images using a Bayer pattern or other configurations. In another example, the image 110 may be data captured of an image initially captured using film by the image capture device 104, e.g., a scan of an image developed on paper from film and so forth.

Regardless of how the image 110 originated, the image 110 may be obtained by an image processing module 112 for processing. Although illustrated as being implemented on the computing device 102, functionality represented by the image processing module 112 may also be implemented in whole or in part "over the cloud" via the network 114, such as by a server farm as part of a web service, in a distributed environment, and so on as further described in relation to FIG. 8.

An example of image processing functionality that may be implemented by the image processing module 112 is represented as an image prior module 116 and a reconstruction module 118. The image prior module 116 is representative of functionality to generate an image prior 120. The image prior 120 may then be employed by the reconstruction module 118 to reconstruct the image 110 to form a processed image 122. As shown in FIG. 1, for instance, the image 110 includes an aircraft that is captured from an image scene 108. The image 110, however, is blurry, such as due to environmental or other factors. Accordingly, the image 110 may be processed by the reconstruction module 118 using an image prior 120 generated by the image prior module 116 to generate a processed image 122 as shown on a display device of the computing device 102 that has been deblurred. A variety of other reconstruction techniques may also be performed, such as hole filling, image restoration, compression artifact corrections, de-mosaicing, super resolution and up sampling, denoising operations, and so on. Further description of operation of the image prior module 116 and the reconstruction module 118 may be found in relation to the following discussion and corresponding figure.

Figure 2:
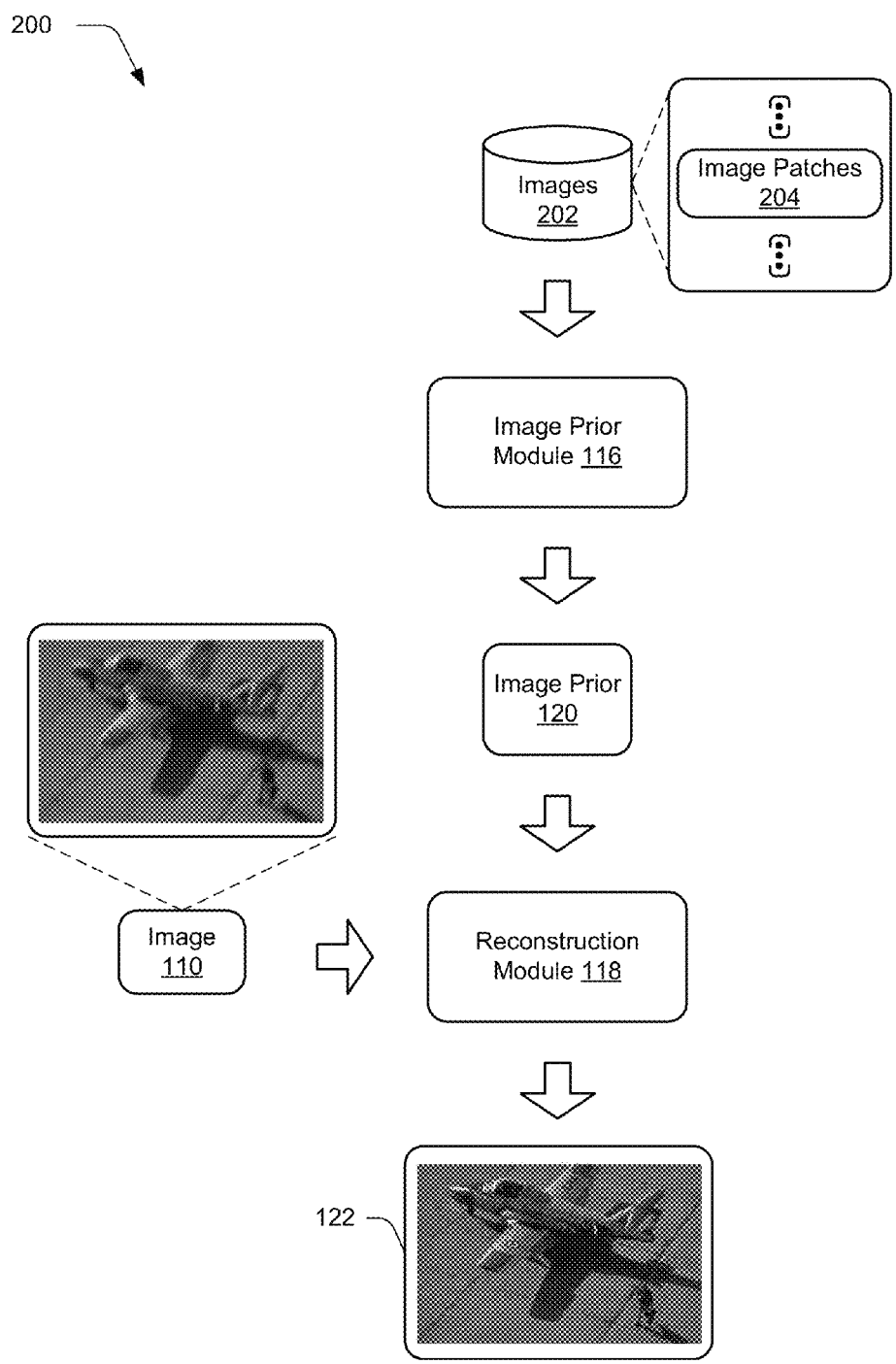
FIG. 2 depicts a system in an example implementation in which an image prior module and a reconstruction module of FIG. 1 are shown in greater detail.

FIG. 2 depicts a system 200 in an example implementation in which the image prior module, reconstruction module 118, and operation thereof are shown in greater detail. Continuing with the previous example, a corrupted image 110 may be processed by the reconstruction module 118 to form a processed image 122 that is a restored version of the image 110. Performance of this reconstruction may be treated as an optimization problem that has two terms. The first term is a data term which forces the restored image 122 to be generally similar to the input image 110 and thus protects against formation of a different image after reconstruction. The second term defines an image prior 120 which forces the restored image 122 to follow the general rules defined by the prior, e.g., statistics of natural images. The main optimization has the following form:

$$E(I)=E_{data}(I)+\lambda E_{prior}(I)$$

A variety of different properties may be defined by the image prior 120, e.g., of natural image, such as sparsity of an image gradient as a prior that specified that a natural image is to have sparse gradients. The image prior 120 may also be defined for patches such that patches of the restored image 122 follow the statistics of natural image patches.

To learn the statistics used to generate the image prior 120, the image prior module 116 may utilize a database of images 202. For example, the image prior module 116 may randomly sample image patches 204 from the images 202. Conventional techniques that were utilized to generate the image prior 120, however, experienced a bottleneck in performing a search for a best Gaussian. For example, a likelihood is computed for each patch in the image for each Gaussian and thus has a computational complexity for computing this likelihood of "O(n2)" where "n" is the number of pixels in each patch. In general, given a prior model with "k" Gaussians the overall complexity is "O(kn2)." Through use of a shared basis mixture technique, however, the likelihood in "O(n)" with an improvement in accuracy. Further discussion of this technique may be found in greater detail below.

Shared Basis Mixtures

The following describes Shared-Basis Mixture (SBM) techniques that may be utilized to generate image priors, e.g., for modeling natural image patch distributions or any other type of image patch. The image priors, for instance, may be utilized to model structures found in natural images which may be based on patches taken from examples of natural images. Although examples of natural image patches are described in the following it should be readily apparent that other types of image patches are also contemplated without departing from the spirit and scope thereof As previously described, Gaussian mixture models may be configured as a type of density model having a number of Gaussian component functions. These Gaussian component functions are combined to define a multimodal density which may be employed for a variety of purposes, such as to model colors and textures to define structures in an image as described above. Thus, the Gaussian mixture models generated from the image may be utilized to define structure and other components found in those images.

Conventional Gaussian mixture models, however, provide a general representation that was often statistically inefficient, computationally inefficient, and challenging to interpret. Accordingly, a Shared Basis Mixture (SBM) is described that may be utilized to generate an image prior. An observation is employed in generation of the models, the observation realized that when Gaussian mixture models are learned from natural image patches, the eigenvectors of their covariance matrices share a similar structure. Therefore, an SBM is described as follows as a Gaussian mixture model in which each of the Gaussian components explicitly share the same basis functions, i.e., basis vectors. For example, each Gaussian in the Gaussian mixture model may be represented by a mean vector and a covariance matrix. In this example, Gaussians may be learned in such a way that the same basis vectors are shared but each Gaussian is permitted to have different coefficients. In this way, the Shared-Basis Mixture may be utilized to generate a model that is more compact, efficient, interpretable, and effective over conventional techniques as further described below.

To generate the Gaussian mixture module, structures of natural images patches may be "learned". A natural image patch may be represented by an NI-dimensional data vector "y." In the following, examples are described that use "8×8" patches and so "M=64." Each of the patches have a corresponding DC-component subtracted and thus "y" represents a patch after its average value has been removed. The SBM has "J" zero-mean Gaussian mixture components with covariance matrices "$K_j$". The covariance matrices share a "M×D" basis matrix "U," but each has their own diagonal scaling matrix "$\Lambda_1$":

$$K_j = U\Lambda_j U^T + \alpha I \quad (1)$$

where "α" is a per-pixel variance. Each component has an activation likelihood of "$\alpha_j$," and each data point "y" has an associated hidden label "L," with "L=j" meaning that the point comes from component "j." Hence, given the model parameters "$\theta = \{\alpha_{1:J}, U, \Lambda_{1:J}, \alpha\}$," the full model may be written as follows:

$$L|\theta \sim \text{Multinomial}(\alpha_{1:J}) \quad (2)$$

$$y|\theta, L=j \sim \mathcal{N}(0, U\Lambda_j U^T + \alpha I) \quad (3)$$

This is a Gaussian Mixture Model, but with a reduced parameterization of the covariance matrices. The likelihood of a data point may be expressed as follows:

$$p(y|\theta) = \sum_j a_j \mathcal{N}(y; 0, U\Lambda_j U^T + \alpha I) \quad (4)$$

In the following discussion, use of different constraints on the basis "U" is explored, which leads to different representations and learning algorithms. First, a complete basis "U" is considered, in which "U" is an invertible matrix. Use of a complete basis "U" may lead to fast reconstruction performance and use of an Independent Components basis leads to an interesting edge-based model as further described below. An overcomplete basis is also discussed, which yields the highest reconstruction accuracy.

Complete Bases (RSBM AND NSBM)

Figure 3:
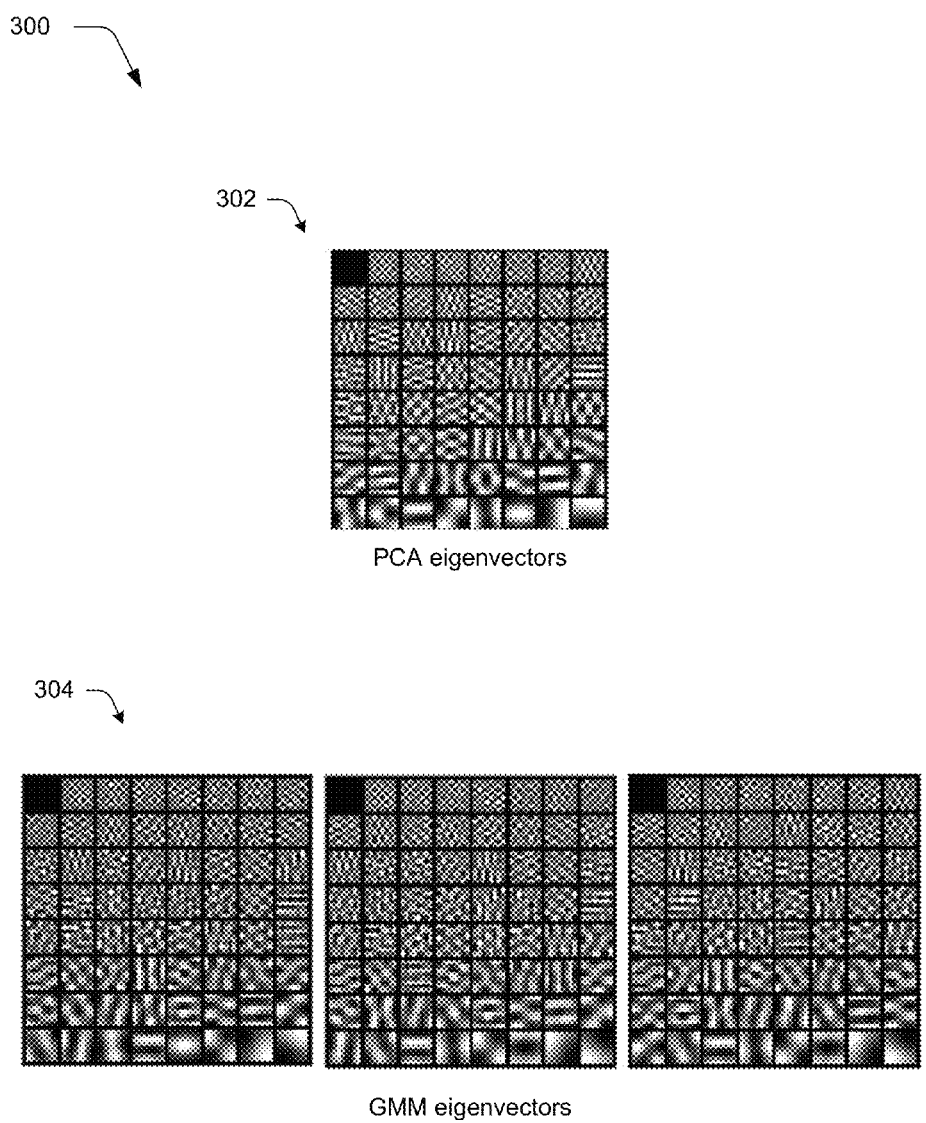
FIG. 3 depicts an example implementation showing basis vectors from natural image patches.

FIG. 3 depicts an example implementation 300 showing basis vectors from natural image patches. The implementation 300 includes probabilistic component analysis (PCA) eigenvectors 302 along with GMM eigenvectors of the three highest-weighted GMM components. As illustrated, the GMM bases represented by the GMM eigenvectors 304 appear similar to the PCA eigenvectors 302 as well as to each other. Qualitatively, each of the bases appear the same, up to rotations, reflections, and inversions and thus the question is raised, can the same basis functions be used for each of the components and thus drastically reduce the number of parameters in the model and increase its efficiency.

In this section, models are learned in which the shared basis "U" is fixed to be a square, invertible matrix. The shared basis "U" is fixed to be the PCA eigenbasis, which is referred to as the Orthonormal Shared Basis Mixture (RSBM) in the following. A version is also considered in which "U" is determined by the Independent Components of natural images, which is referred to as the Non-Orthonormal Shared Basis Mixture (NSBM) in the following.

Expectation/Maximization Algorithm

FIG. 4 depicts an example implementation 400 of an expectation/maximization (EM) algorithm configured to learn a shared basis mixture (SBM). An EM algorithm as shown in FIG. 4 may be employed to learn a SBM in which an assumption is made that shared basis "U" is a given, invertible matrix, and "α=0." The algorithm takes as input a collection of DC-subtracted natural image patches "$y_{1:N}$." In the Orthonormal Shared Basis Mixture (RSBM) technique, "U" is fixed to be the eigenvectors of the patch covariance. In the Orthonormal Shared Basis Mixture (NSBM), "U" is computed by Reconstruction Independent Components Analysis (RICA) on the patches.

A Free Energy formulation may be used to derive the EM algorithm. In particular, variational parameters "$\gamma_{ij}$" are introduced, where "$\gamma_{ij}$" represents the probabilistic assignment of patch "i" to cluster "j." The Free Energy objective may then be expressed as the expected data likelihood minus the entropy of "γ" as follows:

$$\mathcal{F}(\gamma, \theta) = -\sum_i \langle \ln p(y_i, L=j|\theta) \rangle_\gamma + \sum_{ij} \gamma_{ij} \ln \gamma_{ij} \quad (5)$$

$$= \frac{1}{2} \sum_{ij} \gamma_{ij} y_i^T U^{-T} \Lambda_j^{-1} U^{-1} y_i + \quad (6)$$

$$\frac{1}{2} \sum_{ij} \gamma_{ij} \ln(2\pi)^D |U|^2 |\Lambda_j| - \sum_{ij} \gamma_{ij} \ln \frac{a_j}{\gamma_{ij}}$$

The EM algorithm may then be derived by optimizing each set of parameters in turn with respect to the free energy. Since the SBM is a Gaussian Mixture Model, the E-step update to "γ" and the M-step update to "α" are the same as for standard GMM. The update to "Λ" is derived by solving "$dF/d\Lambda_j = 0$" as follows:

$$\Lambda_j \leftarrow \left( U^{-1} \left( \frac{\sum_i \gamma_{i,j} y_i y_i^T}{\sum_i \gamma_{i,j}} \right) U^{-T} \right) \cdot I \quad (7)$$

where "∘" denotes an element-wise product and is used to zero off-diagonal matrices of the covariance. This step projects the weighted data covariance into the latent space. The value "$\alpha_{1:J}$" is initialized with a random assignment and each of "$\Lambda_j$" with random values in the diagonal. In each step, a small scalar value "ε" is added to the diagonal of "$\Lambda_j$" for stability.

The basis "U" is not updated in this algorithm because a closed-form update for it is not found. In one or more implementations, a gradient-based optimization in the M-step may also be employed. In the next section, another EM technique is described that allows for use of closed-form updates to basis "U."

Learned Models

Figure 5:
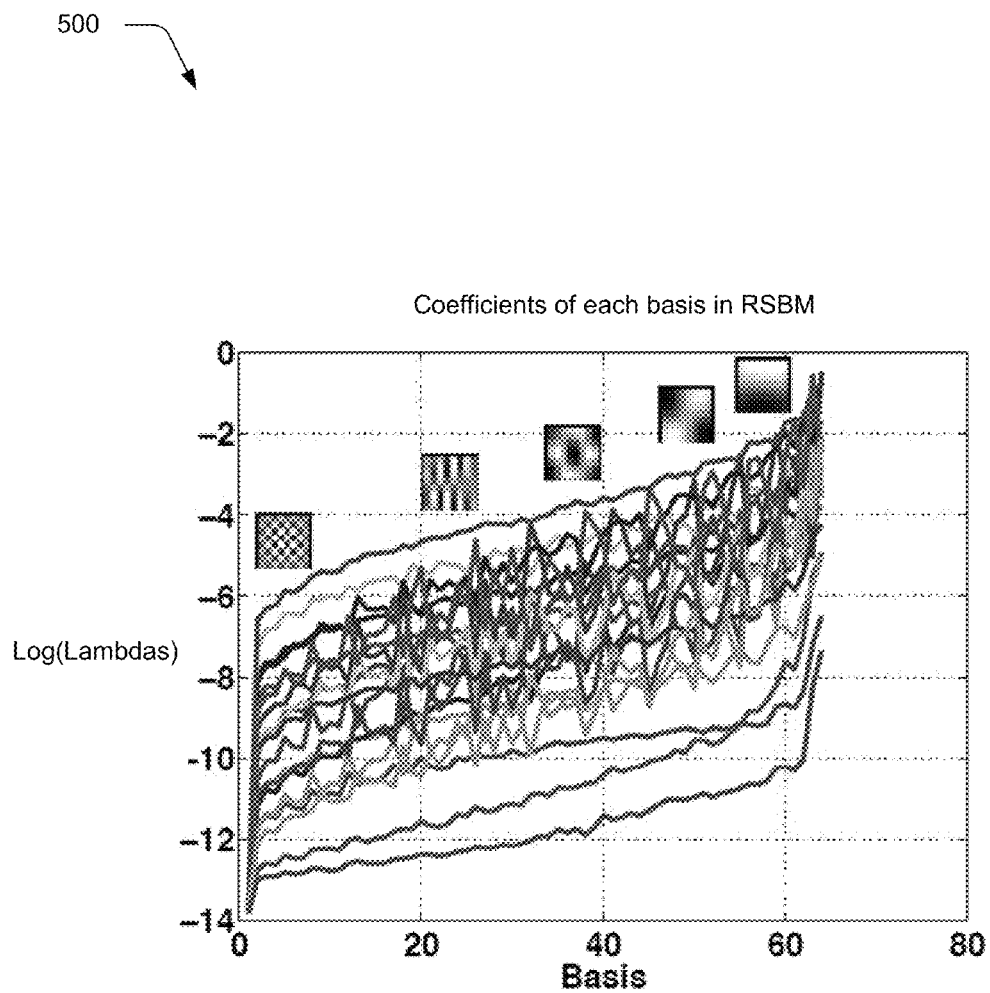

In this example, an image model is learned using 50,000 eight by eight image patches from natural images. Examples, 500, 600 of learned "$\Lambda_j$" values are shown in FIGS. 5 and 6, respectively. In each case, a clear relationship between frequency and variance is shown, with lower frequencies exhibiting higher variance: low-frequency edges are larger. The RICA basis comprises orientation and frequency-selective filters, with horizontal and vertical filters exhibiting higher variance than diagonals. In each case, the learned "$\Lambda_j$" values exhibit a scaling relationship.

Overcomplete Basis (OSBM)

In this example, an overcomplete basis "$U \in R^{M \times D}$" is considered where "D>M." Using a larger basis makes the representation more expressive although the technique described here may also be used to learn a complete or undercomplete basis.

In order to derive an EM algorithm for the overcomplete basis, an alternative representation of the model is employed that allows updating "U" and does not involve inverting it for updating "$\Lambda_j$" as before. The representation has latent coordinates "$x \in R^D$" associated with each data point:

$$L | \theta \sim \text{Multinomial}(\alpha_{1:J}) \quad (8)$$

$$x | L = j, \theta \sim \mathcal{N}(0, \Lambda_j) \quad (9)$$

$$y = Ux + n, n \sim \mathcal{N}(0, \alpha I) \quad (10)$$

Each column of U is specified as a unit norm, in order to resolve a scaling ambiguity. By marginalizing over "L" and "x," this formulation gives identical data likelihood (Equation 4) to the formulation presented above.

EM Algorithm

In this model, the variational parameters describe a distribution "$q(x_{1:N}, L_{1:N})$" over the latent parameters. Accordingly, the Free Energy is expressed as follows:

$$\mathcal{F}(q, \theta) = -\sum_i \langle \ln p(y_i, L_i = j, x_i | \theta) \rangle_q - H(q) \quad (11)$$

$$= -\sum_{ij} \gamma_{ij} \ln a_j + \frac{1}{2} \sum_{ij} \gamma_{ij} tr(\Lambda_j^{-1} \Phi_i^{(j)}) +$$

$$\frac{1}{2} \sum_{ij} \gamma_{ij} \ln |\Lambda_j| - \frac{1}{\alpha} \sum_i y_i^T U \mu_i +$$

$$\frac{1}{2} tr\left(U^T U \sum_{ij} \gamma_{ij} \Phi_i^{(j)}\right) +$$

$$\frac{1}{2\alpha} \sum_i \|y_i\|^2 + \frac{ND}{2} \ln \alpha +$$

$$\frac{N(M+D)}{2} \ln 2\pi - H(q) \quad (12)$$

where the statistics of "q" are "$\gamma$, $\mu_i = \langle x_i \rangle_q$," and "$\Phi_i^{(j)} \equiv \langle x_i x_i^T | L=j \rangle_q$." The expression "$\langle . \rangle_q$" denotes the expected value under the distribution "q." The complete derivations for the Free Energy and EM derivation are described at the end of the discussion. The bases "U" are initialized by concatenating the PCA basis with the RICA basis. In the E-step, the algorithm computes "$\gamma$," "$\mu$" and "$\Phi$." The M-step optimizes the parameters "U," "$\alpha_{1:J}$," "$\Lambda_{1:J}$" and "$\alpha$," given these sufficient statistics and the data. The values of "U" and "$\Lambda$" are also normalized in order to keep the basis vectors unit norm as in relation to equation four. An example of such an algorithm 700 for overcomplete shared basis mixtures is shown in FIG. 7.

Learned Model

An example 800 of a learned OSBM is visualized in FIG. 8. In this example, the bases initialized from PCA have not exhibited a large change, but the bases initialized by RICA change considerably, now exhibiting a number of new edge, corner, and blob structures, which are marked by boxes in the top illustrated example. The learned variances "$\Lambda_j$" values exhibit similar structure as before, where low-frequency patches have higher variance than high-frequency patches, and different components exhibit a scale-mixture-like relationship to each other.

Reconstruction Techniques Using Image Prior

In the following, an example of use of an image model as a prior is described, which is reconstruction in this example but other examples are also contemplated. For example, given a corrupted input image "b," a clean image "c" may be reconstructed. Using a patch-based prior, a reconstruction may be formulated as:

$$E(c) = \frac{\lambda}{2} \|Ac - b\|^2 + \sum_i E_{patch}(P_i c) \quad (13)$$

where the first term represents the form of the corruption process. For instance, in denoising the value "A" is the identity matrix. The matrix "$P_i$" selects the "i-th" patch of "c" and subtracts the DC component. For the patch prior "$E_{patch}(y)$," a cluster assignment version of the GMM or SBM negative log-likelihood may be used for each patch as follows:

$$E_{patch}(y) = -\log \max_j a_j p(y | \theta, L = j) \quad (14)$$

As this may be considered a difficult optimization problem, computationally wise, half-quadratic splitting may be employed which introduces intermediate estimates "$t_i$" for each patch. Accordingly, the revised objective may be expressed as follows:

$$E_{HQ}(c, t) = \frac{\lambda}{2} \|Ac - b\|^2 + \frac{\beta}{2} \sum_i \|P_i c - t_i\|^2 + \sum_i E_{patch}(t_i) \quad (15)$$

The optimization alternates between updating the image estimate "c," and updating each patch estimate "$t_i$." The objective is quadratic with respect to "c," and so the update may be expressed as:

$$c \leftarrow \left(\lambda A^T A + \beta \sum_i P_i^T P_i\right)^{-1} \left(\lambda A^T b + \beta \sum_i P_i^T t_i\right) \quad (16)$$

Additionally, the patches are updated independently. For each patch "i," the optimal mixture component may be determined as follows:

$$L_i \leftarrow \arg\max_j p(L = j | t_i) = \arg\max_j a_j \mathcal{N}(t_i | 0, K_j) \quad (17)$$

where "$K_j$" is the covariance matrix for component "j"; for the SBM, this is given by Equation 1 above. The value of X, is set equal to "$M/\sigma^2$" where "$\sigma$" is the image noise level, and to values that grow exponentially with the iterations. Given the label assignment, the patch estimate is updated by a Wiener filter as follows:

$$t_i \leftarrow \left(K_L + \frac{1}{\beta}I\right)^{-1} K_L P_i b \quad (18)$$

This algorithm has increased efficiency through use of the complete basis models above. A bottleneck in this algorithm may involve selection of the component "$L_j$" for each patch "i", since there are typically "J=200" components to choose from for each pixel. In a complete basis, "U" is invertible and "α=0", and so the component selection via Equation 17 may be streamlined by first precomputing "$U^{-1}t_j$" for each patch as follows:

$$-\log \mathcal{N}(t_i \mid 0, K_j) = \frac{1}{2}t_i^T(U \Lambda_j U^T)^{-1} t_i + \log Z_j \quad (19)$$

$$= \frac{1}{2} v_i^T \text{diag}\Lambda_j^{-1} + \log Z_j$$

where $v_i = (U^{-1}t_i) \cdot (U^{-1}t_i)$ $\quad (20)$ $$Z_j = (2\pi)^{M/2} |U| |\Lambda_j|^{1/2} \quad (21)$$

where "∘" denotes element-wise product. Since "$v_i$" is computed once per patch, the running time of "0 (JM²)" per patch is replaced with "0(JM+M²)" to compute the best component for each patch. Since this process is run on hundreds of thousands of patches at each iteration, the speed-up is significant and thus consumption of computational resources may be greatly reduced.

Implementation Examples

In this section, models for denoising and deblurring tasks are evaluated using the above image priors. Quantitative and qualitative comparisons are described between the techniques, and the effects of varying training set size and the numbers of parameters in the models are explored.

For this denoising example, images in this example are corrupted with Gaussian noise with a standard deviation of "σ=25", for intensity values in "0 ... 255". For deblurring, 10 blur kernels are used with added noise with "σ=2.55." In the following a comparison is performed between SBM models and GMM on denoising and non-blind deblurring tasks. For denoising, a comparison is also made with a denoising technique known as Block Matching and 3D Filtering (BM3D).

Figure 9:
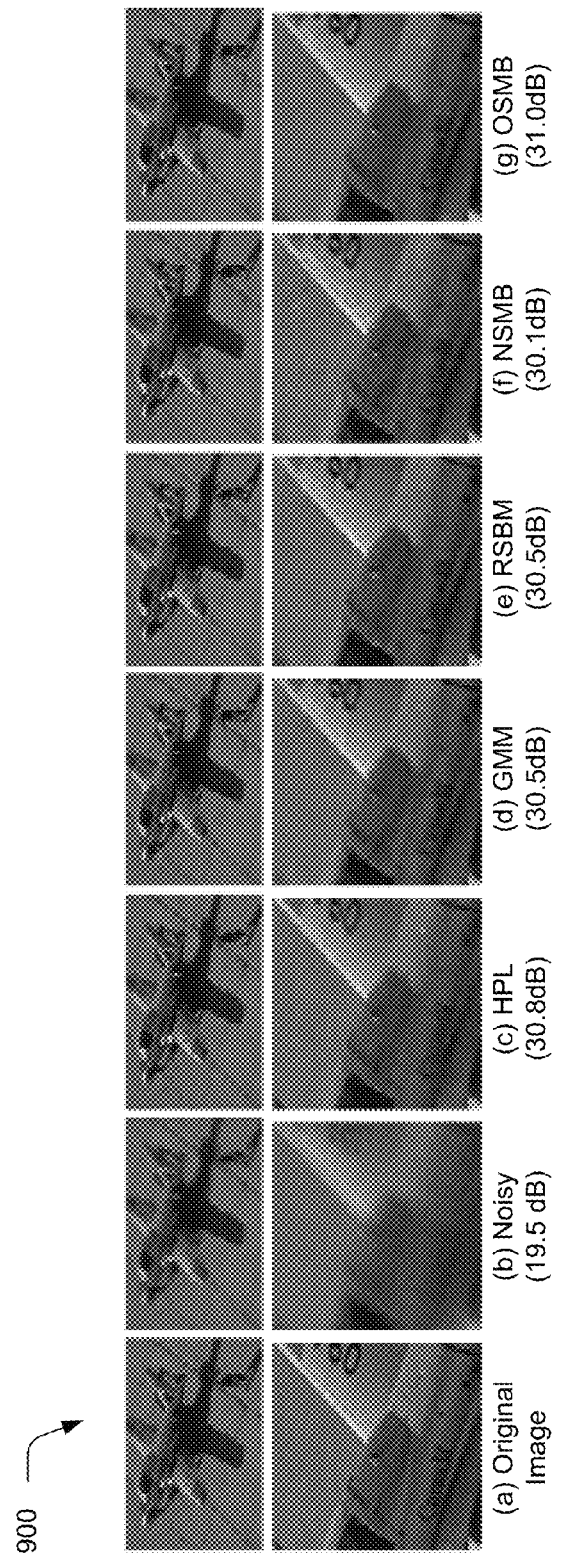
FIGS. 9 and 10 show examples, respectively, of visual comparisons between different shared basis mixture models as well as some conventional denoising and deblurring methods.
Figure 10:

FIGS. 9 and 10 show examples 900, 1000, respectively of visual comparisons between different SBM models as well as some conventional denoising and deblurring methods. In general, the OSBM technique described above does best at both preserving edge details while suppressing noise in smooth regions, whereas GMM introduces noise near sharp edges. The RSBM technique may tend to create artificial horizontal and vertical patterns in some instances, especially around diagonal edges as shown in FIG. 10. BM3D results often look visually pleasing, as the noise is filtered well in uniform and edge-like regions. However it tends to over-smooth unique structures where no similar patches can be found, e.g., in the eye region in FIG. 10. Finally, results of a Hyper-Lapacian Prior (HPL) techniques are shown which, by being based on a sparse prior, tends towards piecewise flat regions and over smoothing of highly textured regions, e.g., the "Canada" letters in FIG. 9.

Example Procedures

The following discussion describes image prior techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

Figure 11:
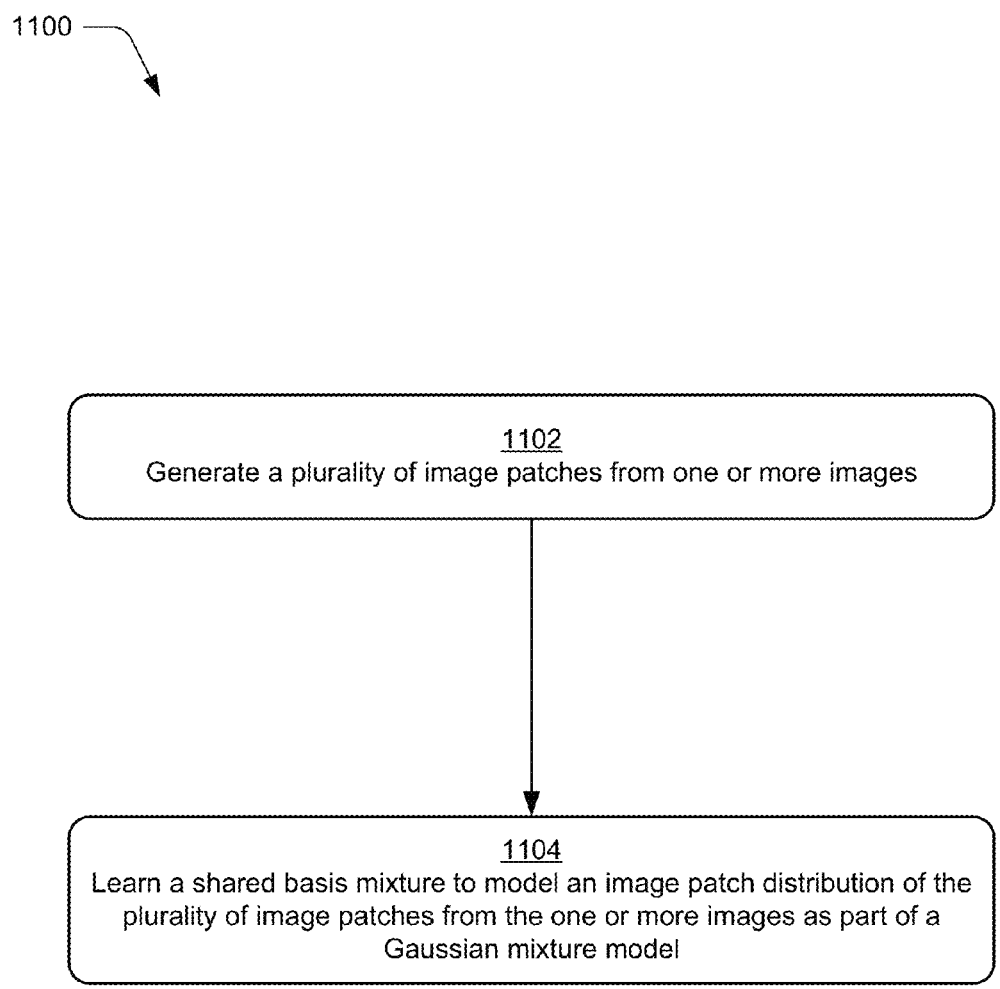
FIG. 11 is a flow diagram depicting a procedure in an example implementation in which a shared basis mixture model is learned.

FIG. 11 depicts a procedure 1100 in an example implementation in which a shared basis mixture model is learned. A plurality of patches are generated from one or more images (block 1102). An image prior module 116, for instance, may generate image patches 204 from a plurality of images 202 from an image database. A variety of different sizes of patches are contemplated, such as a square eight by eight image patch, non-square patches, and so on.

A shared basis mixture is learned to model an image patch distribution of the plurality of image patches from the one or more images as part of a Gaussian mixture model (block 1104). The learning of the shared basis mixture, for instance, may be performed such that each of the Gaussian components explicitly shares basis functions, one with another. This may be performed using an expectation/maximization (EM) algorithm. A variety of different basis mixtures are contemplated, such as an orthonormal shared basis mixture (RSBM), non-orthonormal shared basis mixture (NSBM), and so on.

Figure 12:
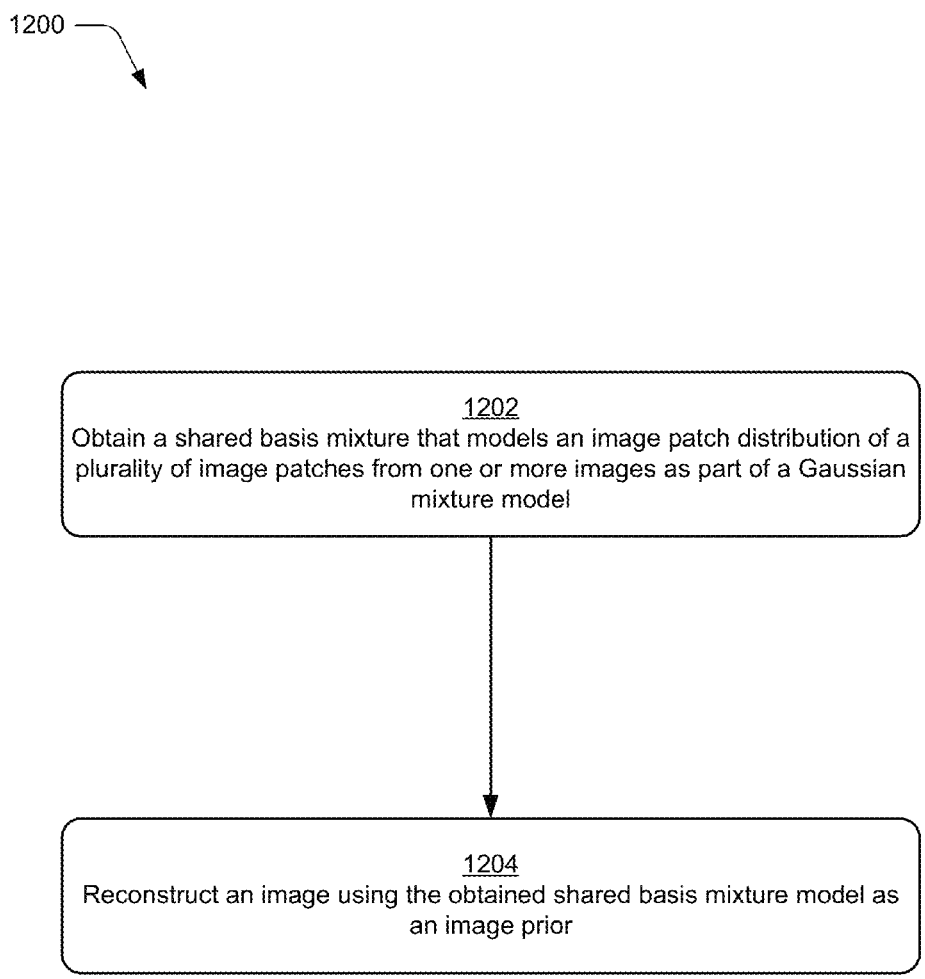
FIG. 12 is a flow diagram depicting a procedure in an example implementation in which a shared basis mixture model is used as an image prior to perform image reconstruction.

FIG. 12 depict a procedure 1200 in an example implementation in which a shared basis mixture model is used as an image prior to perform image reconstruction. A shared basis mixture is obtained that models an image patch distribution of a plurality of image patches from one or more images as part of a Gaussian mixture model (block 1202). As before, the learning of the shared basis mixture may be performed such that each of the Gaussian components explicitly shares basis functions, one with another. This may be performed using an expectation/maximization (EM) algorithm. A variety of different basis mixtures are contemplated, such as an orthonormal shared basis mixture (RSBM), non-orthonormal shared basis mixture (NSBM), and so on.

An image is reconstructed using the obtained shared basis mixture model as an image prior (block 1204). A variety of different reconstructions may be performed, such as deblurring, hole filling, denoising operations, and other image processing techniques that employ an image prior.

Example System and Device

Figure 13:
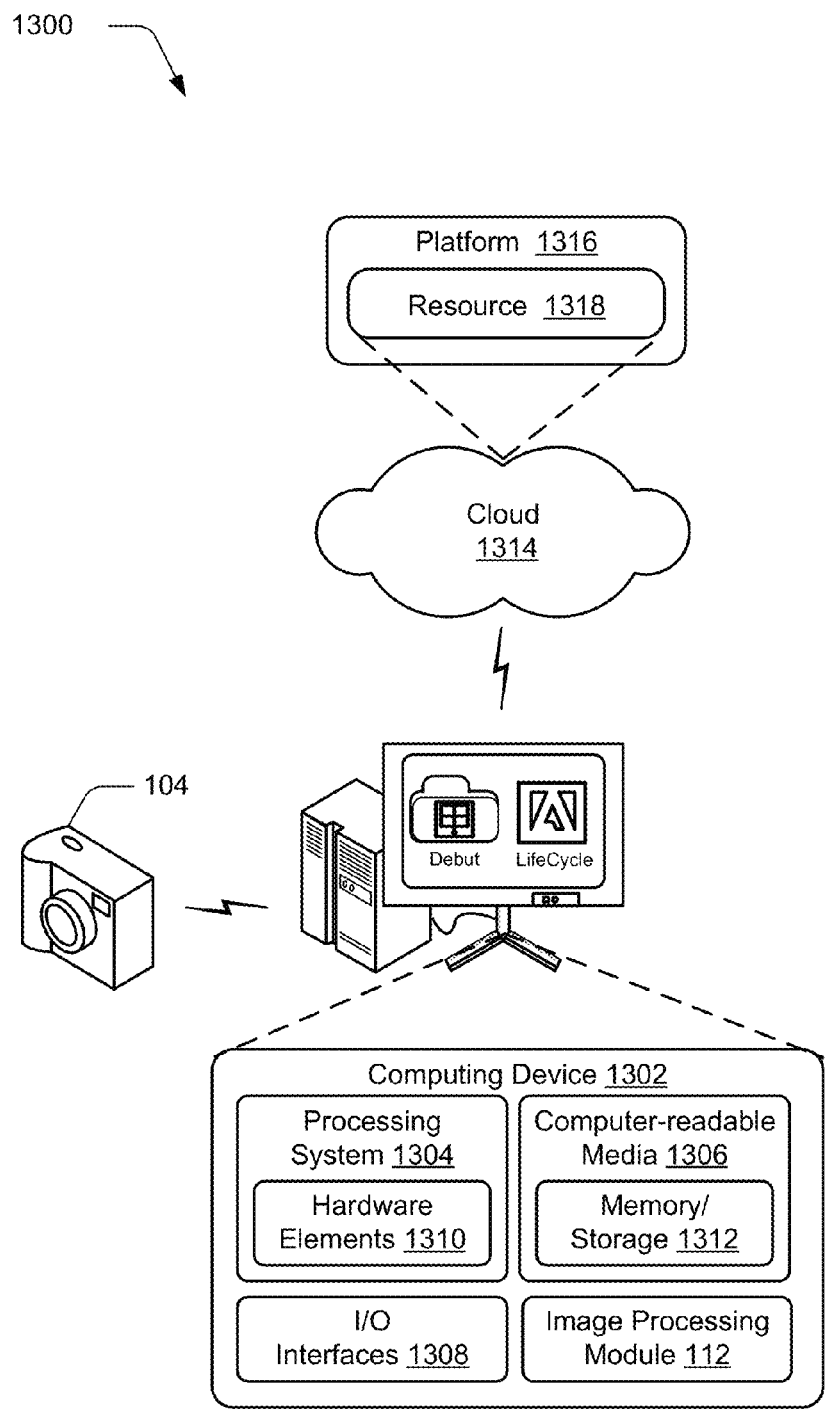
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the image processing module 112, which may be configured to process image data, such as image data captured by an image capture device 104. The computing device 1302 maybe, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
   capturing one or more images from one or more image scenes;
   generating a plurality of image patches from the one or more images; and
   learning a shared basis mixture to model an image patch distribution of the plurality of image patches from the one or more images as part of a Gaussian mixture model, the learning including using independent components of the one or more images and resulting in forming the shared basis mixture as a non-orthonormal shared basis mixture (NSBM).

2. A method as described in claim 1, wherein the learning of the shared basis mixture includes sharing a set of basis vectors.

3. A method as described in claim 1, wherein the learning of the shared basis mixture is performed such that each Gaussian component explicitly shares basis functions, one to another.

4. A method as described in claim 1, further comprising reconstructing at least one image using the learned shared basis mixture as an image prior.

5. A method as described in claim 1, wherein a shared basis of the shared basis mixture is formed as a square matrix that is invertible.

6. A method as described in claim 1, wherein the learning of the shared basis mixture is performed using an overcomplete technique to obtain an overcomplete non-square basis matrix.

7. A method as described in claim 1, wherein the learning is performed using one or more expectation/maximization (EM) algorithms.

8. A method as described in claim 1, wherein the Gaussian mixture model has a number of Gaussian component functions which are combined to define a multimodal density which is employed to model colors and textures of structures in the one or more images.

9. A method implemented by one or more computing devices, the method comprising:
   capturing one or more images from one or more image scenes;
   obtaining a shared basis mixture that models an image patch distribution of a plurality of image patches from the one or more images as part of a Gaussian mixture model, the shared basis mixture learned using an overcomplete technique to obtain an overcomplete non-square basis matrix; and
   reconstructing an image using the obtained shared basis mixture as an image prior.

10. A method as described in claim 9, wherein the shared basis mixture models natural image patch distributions of the one or more images.

11. A method as described in claim 9, wherein the reconstructing includes deblurring, hole filling, image restoration, compression artifact corrections, de-mosaicing, super resolution and up sampling, or denoising operations.

12. A method as described in claim 9, wherein the reconstructing includes using the learned shared basis mixture as an image prior.

13. A method as described in claim 9, wherein the shared basis mixture is configured as an orthonormal shared basis mixture (RSBM) that is learned by sharing eigenvectors between Gaussians that have different eigenvalues.

14. A method as described in claim 9, wherein the shared basis mixture is configured as an non-orthonormal shared basis mixture (NSBM) that is learned includes using independent components of the one or more images.

15. A system comprising:
   one or more processors; and
   one or more computer-readable media having stored thereon computer-executable instructions that are executable by the one or more processors to perform operations comprising:
      learning a shared basis mixture that models an image patch distribution of a plurality of image patches from one or more images as part of a Gaussian mixture model, the shared basis mixture learned using an overcomplete technique to obtain an overcomplete non-square basis matrix; and
      reconstructing an image using the obtained shared basis mixture model as an image prior.

16. A system as described in claim 15, wherein the reconstructing includes deblurring, hole filling, or denoising operations.

17. A system as described in claim 15, wherein the learning is performed by sharing eigenvectors between Gaussians that have different eigenvalues.

18. A system as described in claim 17, wherein the learning results in forming the shared basis mixture as an orthonormal shared basis mixture (RSBM).

19. A system as described in claim 15, wherein the shared basis mixture models natural image patch distributions of the one or more images.

20. A system as described in claim 15, wherein the learning is performed using one or more expectation/maximization (EM) algorithms.

* * * * *